(12) United States Patent
Banerjee et al.

(10) Patent No.: US 8,176,444 B2
(45) Date of Patent: May 8, 2012

(54) ANALYZING MULTIPLE INDUCED SYSTEMATIC AND STATISTICAL LAYOUT DEPENDENT EFFECTS ON CIRCUIT PERFORMANCE

(75) Inventors: Shayak Banerjee, Austin, TX (US); Dureseti Chidambarrao, Weston, CT (US); James A. Culp, Newburgh, NY (US); Praveen Elakkumanan, Hartsdale, NY (US); Saibal Mukhopadhyay, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 12/426,475

(22) Filed: Apr. 20, 2009

(65) Prior Publication Data

US 2010/0269079 A1    Oct. 21, 2010

(51) Int. Cl.
*G06F 17/50*    (2006.01)

(52) U.S. Cl. ............... 716/51; 716/52; 716/53; 716/54; 716/55; 716/56

(58) Field of Classification Search ............. 716/50–56, 716/108–113
See application file for complete search history.

(56) References Cited

U.S. PATENT DOCUMENTS

| | | | |
|---|---|---|---|
| 6,941,531 B1 | 9/2005 | Teig et al. | |
| 6,978,229 B1 | 12/2005 | Saxena et al. | |
| 7,765,498 B1 * | 7/2010 | Ho et al. | 716/133 |
| 7,802,218 B2 * | 9/2010 | Inoue et al. | 716/111 |
| 7,835,888 B2 * | 11/2010 | Inoue et al. | 702/194 |
| 7,861,203 B2 * | 12/2010 | White et al. | 716/129 |
| 2006/0150132 A1 | 7/2006 | Gupta | |
| 2007/0204245 A1 | 8/2007 | Fotakis et al. | |
| 2008/0066024 A1 * | 3/2008 | Mina et al. | 716/4 |
| 2008/0263495 A1 * | 10/2008 | Yamada | 716/12 |

OTHER PUBLICATIONS

"ASIC design flow considering lithography-induced effects", by K. Cao and J. Hu, IET Circuits Devices Syst., vol. 2, No. 1, Feb. 2008.*
M. Mani and M. Orshansky, "A New Statistical Optimization Algorithm for Gate Sizing", Proc. of ICCD, 2004, pp. 272-277.
J.W. Tschanz et al. "Adaptive Body Bias for Reducing Impacts of Die-to-Die and Within-Die Parameter Variations on Microprocessor Frequency and Leakage", IEEE Journal of Solid-State Circuits, vol. 37, No. 11, Nov. 2002.
C. Visweswariah et al. "First-order incremental block-based statistical timing analysis", Proc. of 41st Design Automation Conference, 2004, pp. 331-336.W.
C.S. Amin et al. "Statistical Static Timing Analysis: how simple can we get?", Proc. of 42nd Design Automation Conference, 2005, pp. 652-657.
W.-S.Wang et al. "Statistical timing based on incomplete probabilistic descriptions of parameter uncertainty", Proceedings of 43rd Design Automation Conference, 2006.

(Continued)

*Primary Examiner* — Thuan Do
*Assistant Examiner* — Nha Nguyen
(74) *Attorney, Agent, or Firm* — Cantor Colburn LLP; Daniel Schnurmann (57) ABSTRACT

A method for implementing systematic, variation-aware integrated circuit extraction includes inputting a set of processing conditions to a plurality of variation models, each model corresponding to a separate systematic, parametric variation associated with semiconductor manufacturing of an integrated circuit layout; generating, for each variation model, a netlist update attributable to the associated variation, wherein the netlist update is an update with respect to an original netlist extracted from the integrated circuit layout; and storing the netlist updates generated for each of the processing conditions.

18 Claims, 9 Drawing Sheets

OTHER PUBLICATIONS

Y. Zhan et al. "Correlation-aware statistical timing analysis with non-Gaussian delay distributions", Proc. of 42nd Design Automation Conference, 2006, pp. 77-82.

W. J. Poppe et al. "From Poly Line to Transistor: Building BSIM Models for Non-Rectangular Transistors", Proc. SPIE, 2006, vol. 6156, pp. 235-243.

P. Gupta et al. "Modeling of Non-Uniform Device Geometries for Post-Lithography Circuit Analysis", Proc. SPIE, 2006, vol. 6156, pp. 285-294.

K. Bernstein, et al. "High Performance CMOS variability in the 65-nm regime and beyond", IBM Journal of Research and Development, vol. 50, No. 4/5, 2006.

P. Gupta et al. "Toward a Systematic-Variation Aware Timing Methodology", Proc. of 41st Design Automation Conference, 2004, pp. 321-326.

L. Liebmann et al. "High-performance circuit design for the RET-enabled 65-nm technology node", Proc. of SPIE, vol. 5379, 2004.

Y. Granik "Correction for etch proximity: new models and applications", Proc. of SPIE, vol. 4346, 2001.

J. Sleight et al. "Challenges and Opportunities for High Performance 32nm CMOS Technology", International Electron Devices Meeting, 2006, pp. 1-4.

R. A. Bianchi et al. "Accurate modeling of trench isolation induced mechanical stress effects on MOSFET electrical performance," IEDM Tech. Dig., 2002, pp. 117-120.

L. Liebmann et al. "Reducing DfM to practice: the lithography manufacturability assessor", Proc. of SPIE, vol. 6156, 2006.

C. J. Progler et al. "Impact of lithography variability on statistical timing behavior:" Design and Process Integration for Microelectronic Manufacturing II, Edited by L. Liebamann, Proceedings of SPIE, Vo. 5379, pp. 101-110, 2004.

S. Tirumala et al.,"Bringing Manufacturing into Design via Process-Dependent SPICE Models," Proceedings of the 7th International Symposium on Quality Electronic Design; IEEE, 2006.

* cited by examiner

ANALYZING MULTIPLE INDUCED SYSTEMATIC AND STATISTICAL LAYOUT DEPENDENT EFFECTS ON CIRCUIT PERFORMANCE

BACKGROUND

The present invention relates generally to integrated circuit (IC) design and, more particularly, to analyzing multiple induced systematic and statistical layout dependent effects on circuit performance.

Yield loss mechanisms in IC manufacturing may generally be categorized into catastrophic (or functional) yield loss mechanisms and parametric yield loss mechanisms, with the latter consisting of both random and systematic components. Catastrophic yield loss refers to defects formed during manufacturing due to local or global process faults such as (for example) oxidation pinholes, mask misalignments, opens or shorts due to incorrect metallization or contamination, etc. Parametric variability, on the other hand, is governed by statistical variation in circuit parameters such as threshold voltage, gate length, oxide thickness, etc. This affects yield loss by leading to circuit performance that does not meet design constraints in terms of timing or power. Significant Design for Manufacturability (DfM) efforts, such as critical area analysis and addition of redundancy, have thus far been focused on analyzing and mitigating catastrophic yield issues.

Technology forecasts show that for 45 nanometer (nm) technology and beyond, parametric uncertainty accounts for an increasingly larger percentage of the total yield loss, with understood systematic parametric variations constituting a significantly high percentage of the same. This increased sensitivity to layout-dependent systematic variations has resulted from competitive chip density needs, which in turn are forcing shapes together that interact in highly complex ways. Certain circuit-level techniques have been used, to good effect, to deal with parameter uncertainty. These techniques have been implemented either at design time using uncertainty aware gate sizing algorithms, or at the post-design tuning stage using adaptive body biasing. Efforts have also been made in timing sign-off with the advent of statistical static timing analysis, however current commercial tools assume cell delays to be normally distributed (an approximation which has been shown to be increasingly inaccurate with each new technology node). While some work has explored the use of non-Gaussian distributions in describing cell delays, results have been mostly conservative in view of the lack of knowledge of the exact nature of delay distributions.

Lithography has long been a primary source of systematic variation, but the impact of variations in dose and defocus on cell delay is not incorporated in extraction. As used herein, integrated circuit extraction or simply "extraction" generally refers to shape processing of the features of a circuit layout in order to determine and assign various electrical parameters corresponding to the design features (i.e., translating the layout back into the electrical circuit or netlist it is intended to represent).

In addition, etching is presently a second studied source of variation, wherein etch rates vary according to different layout configurations. However, current extraction methods do not model the impact of etch rate variations on gate length, and consequently circuit delay.

Contact resistance is still another contributing factor to timing uncertainty in 45 nm and beyond. The impact of contact resistance is measured by mapping the generated contact litho contour to its corresponding device resistance using a three-dimensional truncated cone model. While a conventional extraction does incorporate contact resistance into calculating effective device resistance, variations in contact processing, such as contact dose and defocus, are not taken into account. Consequently, extraction is inaccurate in predicting device resistance at contact processing corners, which are different from the nominal. Finally, a fourth known systematic yield loss mechanism is mechanical stress that is observed as an impact on electron mobility, which in turn is dependent on certain layout parameters such as poly-to-poly spacing, poly-to-N-well boundary spacing, poly-to-contact spacing, etc. Lithographic variations cause these contacts to shift, thus leading to stress variations in the channel.

Accordingly, it would be desirable to be able to implement an improved method of performing integrated circuit extraction in a manner that more robustly accounts for systematic processing variations.

BRIEF SUMMARY

In an exemplary embodiment, a method for implementing systematic, variation-aware integrated circuit extraction includes inputting a set of processing conditions to a plurality of variation models, each model corresponding to a separate systematic, parametric variation associated with semiconductor manufacturing of an integrated circuit layout; generating, for each variation model, a netlist update attributable to the associated variation, wherein the netlist update is an update with respect to an original netlist extracted from the integrated circuit layout; and storing the netlist updates generated for each of the processing conditions.

In another embodiment, a computer program product includes a computer readable storage medium having computer program code stored thereon that, when executed, cause a computer to implement a method for implementing systematic, variation-aware integrated circuit extraction. The method includes inputting a set of processing conditions to a plurality of variation models, each model corresponding to a separate systematic, parametric variation associated with semiconductor manufacturing of an integrated circuit layout; generating, for each variation model, a netlist update attributable to the associated variation, wherein the netlist update is an update with respect to an original netlist extracted from the integrated circuit layout; and storing the netlist updates generated for each of the processing conditions.

In another embodiment, a method for implementing systematic, variation-aware integrated circuit extraction includes generating a plurality of contact area (CA) contours for an integrated circuit layout based on a plurality of CA process conditions; inputting the CA contours to a CA resistance model so as to determine a variation in CA resistance ($\Delta R_{CA}$); calculating a change in device resistance as a function of $\Delta R_{CA}$; and generating and storing one or more netlist updates attributable to variations in CA process conditions, wherein the netlist updates are updates with respect to an original netlist extracted from the integrated circuit layout.

In still another embodiment, a method for implementing systematic, variation-aware integrated circuit extraction includes inputting a plurality of etch process conditions to an etch model so as to determine a variation in polysilicon conductor to polysilicon conductor (PC to PC) distance for an integrated circuit layout; using variational etch bias computed as a function of the PC-PC distance to modify an effective gate length for devices of the integrated circuit layout; and generating and storing one or more netlist updates attributable to variations in etch bias conditions, wherein the netlist updates are updates with respect to an original netlist extracted from the integrated circuit layout.

BRIEF DESCRIPTION OF THE SEVERAL VIEWS OF THE DRAWINGS

Referring to the exemplary drawings wherein like elements are numbered alike in the several Figures.

DETAILED DESCRIPTION

As indicated above, yield loss due to process variations may be classified as catastrophic or parametric. Parametric variations may further be classified as being random or systematic in nature. Systematic parametric variations are being projected as a major yield limiter in sub-65 nm technologies. Though several models exist to describe process-induced parametric variations in layouts, there is no existing methodology to study their impact at the circuit level. Accordingly, a methodology is disclosed for analyzing multiple process-induced systematic and statistical layout dependent effects on circuit performance.

Briefly stated, physical design models are used to describe four major sources of parametric variability (lithography, stress, etch and contact resistance), as well as their impact on device properties. A methodology to determine variability in circuit performance, based on integrating the device models, is then implemented through a circuit simulator such as SPICE (Simulation Program with Integrated Circuit Emphasis), for example. A circuit simulation engine for 45 nm silicon-on-insulator (SOI) devices is implemented, which shows the extent of the impact of layout-dependent systematic variations on circuit parameters like delay and power. Based on the analysis, the present invention embodiments contemplate that all systematic effects are preferably simultaneously included to match the hardware data. Thus configured, such a process flow that is capable of understanding process-induced parametric variability will have major advantages in terms of improving physical design and yield, in addition to reducing design to hardware miscorrelations and advantages in terms of diagnosis and silicon debugging.

Variations in the lithography process may be classified into five general categories: dose, focus, mask errors, X-overlay and Y-overlay. For each process point in polysilicon processing (which is the most critical from timing perspective), the lithography process produces a printed contour. Current circuit-level simulators widely used in both industry and research (such as SPICE) implicitly assume that the gate structure is rectangular. This assumption allows just a single value of gate length to describe the behavior of a transistor. However, due to a variety of factors such as the approaching limits of diffraction, mask errors and variations in process conditions, existing gate regions hardly exhibit perfectly polygonal shapes. This has led to a need to model the resulting behavior of a transistor with non-rectangular gate structure.

In order to analyze the behavior of a polysilicon contour, a "slicing" technique is used. The model works on the fundamental principle that any transistor can be represented as a set of parallel transistors (called slices) provided the sum of the widths of the set equals the width of the transistor. Additional information regarding transistor slicing may be found in P. Gupta, A. Kahng, Y. Kim, S. Shah and D. Sylvester, "Modeling of Non-Uniform Device Geometries for Post-Lithography Circuit Analysis", *Proc. SPIE*, 2006, Vol. 6156, pp. 285-294, the contents of which are incorporated herein by reference in their entirety.

Essentially, a resist contour is sliced along its width into segments of equal width, $W_{seg}$. The slice itself is assumed to be small enough so as to have a constant length $L(x)$. For each slice n, the current per unit width $I(x)$ flowing from drain to source may be calculated as a function of $L(x)$ from a pre-computed current per unit width versus gate length graph (not shown). The total current $I_{shape}$ is then calculated as the sum of these individual currents, which can then be used to derive an effective gate length $L_{eff}$ describing the current behavior of the contour, using the same graph. This effective gate length may then be used as an input to SPICE to effectively describe the timing behavior of the transistor. The flow is summarized by the set of equations described below:

$$I(x) = f[L(x)] \quad \text{(Eq. 1)}$$

$$I_{shape} = \sum_x I(x) W_{seg} \quad \text{(Eq. 2)}$$

$$L_{eff} = f^{-1}(I_{shape}/W) \quad \text{(Eq. 3)}$$

While the above described model has been developed to describe the timing behavior of a transistor, it can quite easily be adapted to measure the leakage properties as well. Assuming drain-to-source leakage to be the dominant source of leakage power, the same contour-based current calculation may be used with $I_{off}(x)$ in place of $I(x)$, where $I_{off}$ is determined from a leakage current per unit width versus gate length curve (not shown). The decision on which type of current to measure depends on whether timing or leakage is the metric of interest for design closure.

Contact resistance and capacitance depend on contact area. Despite the use of optical proximity correction (OPC) techniques, variations in processing conditions such as focus and exposure dose lead to variations in contact area. This leads to a change in per stud resistance/capacitance which in turn leads to a change in the device current. In N. Rohrer et al., "High-performance CMOS variability in the 65-nm regime and beyond", *IBM Journal of Research and Development*, Vol. 50, No. 4/5, 2006, there is disclosed the use of a truncated cone model to describe the contact as a resistance network, with the resistance values correlated to the area. However, running extraction to compute device resistance due to a change in contact resistance at every process corner is computationally inefficient. In order to analyze the impact of change in contact resistance on circuit performance, a piecewise linear model is used. Given that effective source/drain resistance ($R_{eff}$) is a function of various factors such as silicide resistance, sheet resistance, contact resistance, etc. a first-order Taylor expansion is used to relate the change in $R_{eff}$ to change in contact resistance $\Delta R_{CA}$:

$$R_{eff} = f(R_{CA}, R_{silicide}, R_{sheet}, \ldots) \quad \text{(Eq. 4)}$$

$$= > \Delta R_{eff} = \frac{\partial R_{eff}}{\partial R_{CA}} \Delta R_{CA} \quad \text{(Eq. 5)}$$

The term $\Delta R_{CA}$ may be obtained using the truncated cone model described by N. Rohrer et al., while the term ($\delta R_{eff}/\delta R_{CA}$) can be obtained from a piecewise linear graph which is generated by varying the number of contacts on a source/drain region and measuring the effective resistance using an extraction tool.

Stress impacts the mobility of carriers in the substrate. The mobility of carriers has been found to depend not only on source/drain extension length, but also poly-to-poly pitch, gate-to-dual stress liner (DSL) boundary distance, and poly-to-active area boundary distance. Varying process conditions for the poly, active area, etc. lead to a variation in these parameters, which in turn affects the mobility of carriers. Accordingly, the present extraction methodology utilizes the lithographic contours to compute stress model parameters, which in turn produces effective channel mobility at different process corners.

Etch rate variations are found to be an important source of systematic variability in 45 nm and beyond. Etch rate variations lead to gate length bias, which can be computed from the lithographic contours using accurate etch models. This gate length bias can then be passed to the extraction engine coupled with the effective length computed from lithographic contours.

Figure 1:
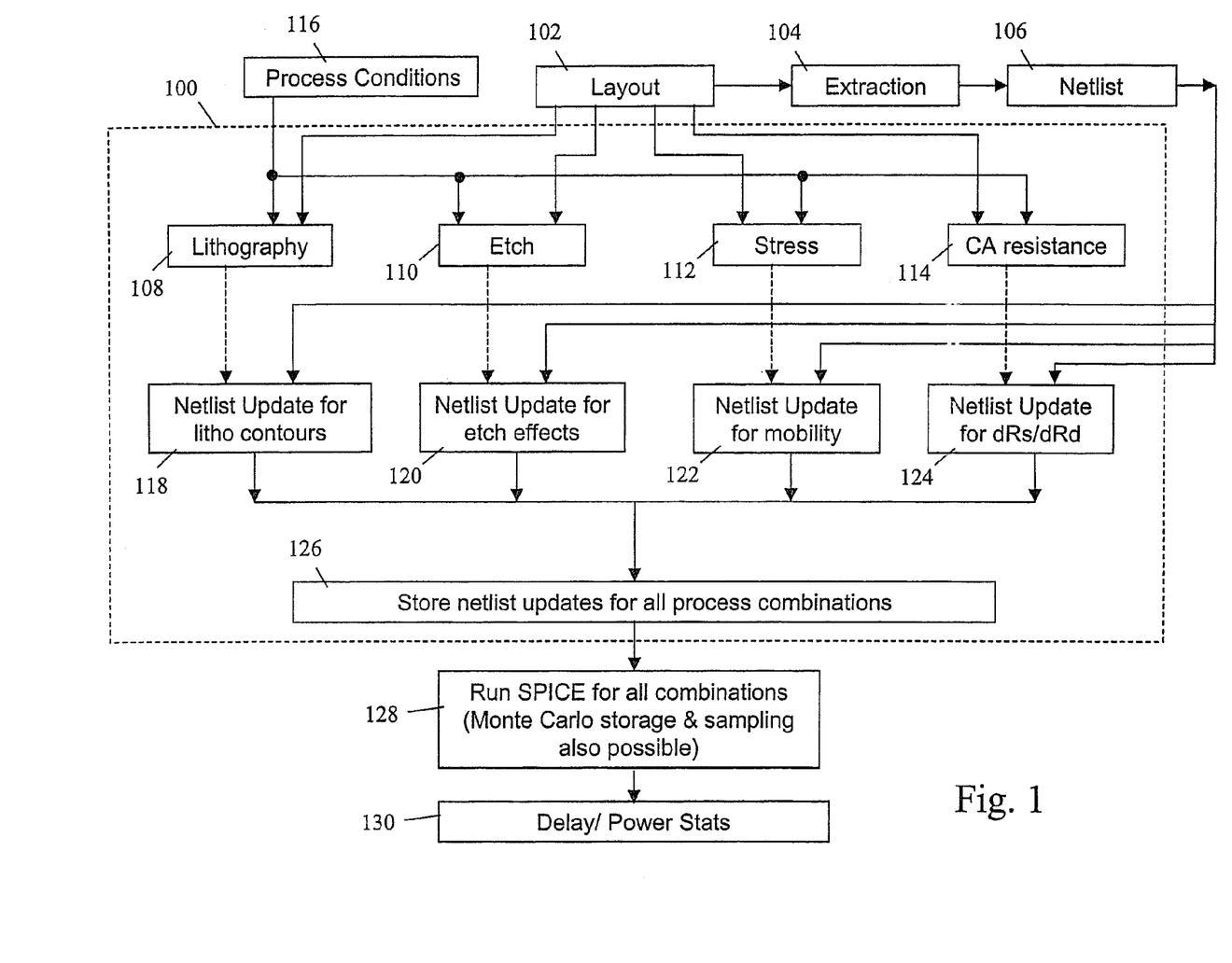
FIG. 1 is a schematic block diagram illustrating a system and method for implementing systematic, variation-aware integrated circuit extraction, in accordance with an embodiment of the invention, assuming independence of parameters.

Referring initially to FIG. 1, there is shown a schematic block diagram illustrating a system and method for implementing systematic, variation-aware integrated circuit extraction, in accordance with an embodiment of the invention. In particular, FIG. 1 illustrates the relationship between conventional extraction and an integrated, variation-aware extraction generally depicted in dashed block 100. In this embodiment, there is assumed no inter-dependencies between the four major systematic variations considered and discussed above (i.e., lithography, etching, stress and contact area parameters).

From an integrated circuit layout 102, a conventional extraction 104 is used to derive an original netlist 106, as is known in the art. However, the original netlist 106 does not reflect the effect of systematic manufacturing variations as discussed above. Thus, the variation-aware extraction block includes four individual systematic variation models: a lithography model 108, an etch model 110, a stress model 112, and a contact area resistance model 114. Again, for the four exemplary systematic variation models contemplated, the embodiment of FIG. 1 assumes no inter-dependencies therebetween. In addition to the layout information from layout 102, a set of process conditions 116 is also input into the variation-aware extraction 100 flow, which include one or more of the following: PC (polysilicon conductor), RX (active silicon), NW (n-type well) and CA (contacts (e.g., between PC or RX and metal layer M1)).

Each of the models 108, 110, 112 and 114 computes a corresponding change to the original netlist 106, based on the layout and the process conditions and generates a corresponding netlist update. In the example depicted, the respective netlist updates include a netlist update for lithography contours 118, a netlist update for etch effects 120, a netlist update for carrier mobility 122, and a netlist update for a change in source versus drain resistance (dRs/DRd) 124. Each netlist update for the various systematic variations may then be cumulatively stored for all process combinations, as reflected in block 126. Finally, as shown in block 128, the netlist updates may then be run (using SPICE, for example) to generate distributions for delay or power (block 130).

Figure 2:
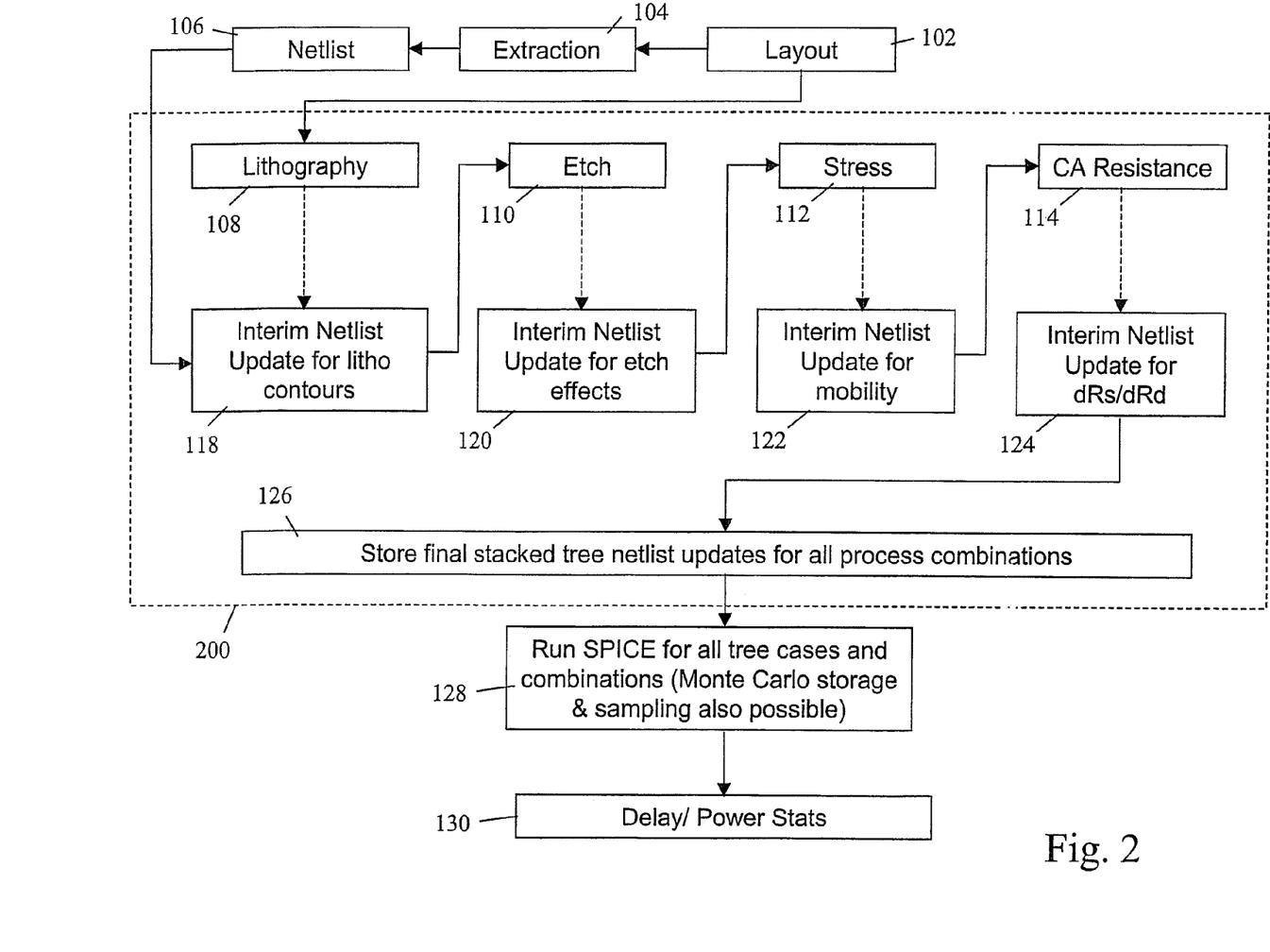
FIG. 2 is a schematic block diagram illustrating a system and method for implementing systematic, variation-aware integrated circuit extraction, in accordance with an alternative embodiment of the invention, based a stacked implementation of inter-dependent parameters.

Referring now to FIG. 2, there is shown schematic block diagram illustrating a system and method for implementing systematic, variation-aware integrated circuit extraction, in accordance with an alternative embodiment of the invention, based a stacked implementation of inter-dependent parameters. That is, for the integrated, variation-aware extraction generally depicted in dashed block 200, the flow assumes that the variations are inter-dependent. For purposes of simplicity and clarity, the diagram in FIG. 2 omits the depiction of the input process conditions (116 of FIG. 1) to the four individual systematic variation models (lithography model 108, etch model 110, stress model 112, and contact area resistance model 114), however it should be understood that the embodiment of FIG. 2 does utilize such process conditions.

In any event, it will be seen from FIG. 2 that the original netlist information 106 is used in generating an updated netlist for a single one of the systemic variation models (in this example, lithography model 108). Instead of inputting the original netlist information 106 to the remaining systematic variation models in parallel, it will be seen that the interim updated netlist information for lithography contours 118 is instead used as an input to the etch variation model 110. Thus, when the etch variation model 110 provides its own updated netlist information, based on etch effects, the interim netlist update 120 includes updated information that take both lithography contour and etch process variations into consideration. The interim netlist update 120 is in turn used as an input to the stress model 112, such that interim netlist update 122 for mobility effects includes updated information that take lithography contour variations, etch process variations and mobility variations into consideration. Then, the interim netlist update 122 is used as an input to the contact resistance model 114. The resulting (dRs/DRd) netlist update 124 (now stacked with all other interim netlist updates for each systemic variation) for all process conditions is then stored at block 126 for SPICE simulation at block 128 to produce delay/power statistics in block 130.

It should be appreciated that in the "stacked" approach to netlist updating, the specific order in which the systematic variations models are applied may be varied (for example, the stress based model 112 could be applied first and thus receive the original netlist information 106 extracted from layout 102).

Figure 3:
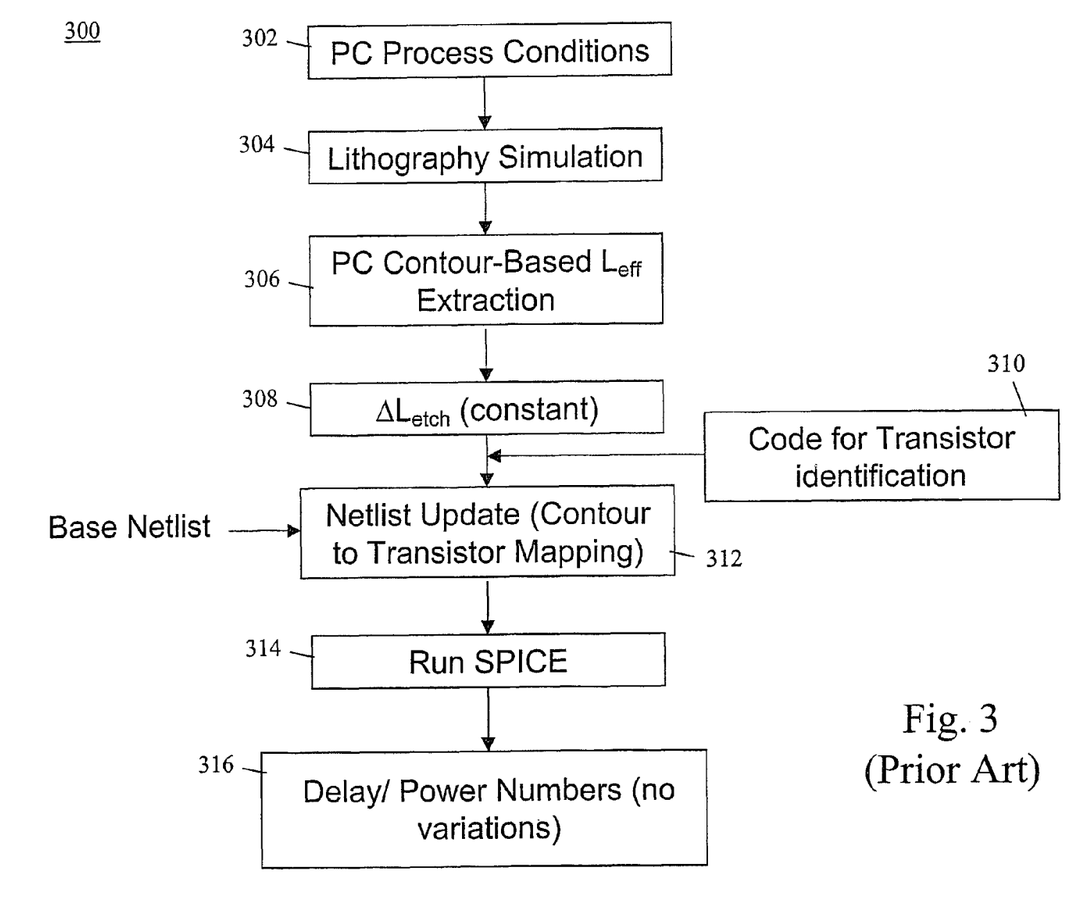
FIG. 3 is a flow diagram illustrating an isolated implementation of lithography-based extraction assuming a uniform etch model as is known in the prior art.

Referring generally now to FIGS. 3 through 8, there are shown various detailed process flows regarding extraction of updated netlist parameters based on individual ones of the above mentioned systematic variation models. By way of comparison, FIGS. 3 and 4 first illustrate conventional extraction techniques for the lithography and stress simulation models, respectively. In FIG. 3, the lithography-aware flow 300 for extraction concentrates on the PC layer since this is the performance-critical layer at the cell timing level. A set of PC process conditions 302 is used as input to simulate lithographic contours at various process corners, as reflected in block 304. A set of electrical contour models are then used to compute the effective gate length of each transistor, which are further mapped to the corresponding netlist of the cell. SPICE is run at each process corner to generate delay or power numbers. Etch bias is computed on the basis of the effective gate length ($L_{eff}$) extracted from lithography models as shown in block 306 and as described above. In addition, a constant etch bias is assumed for all PC structures as reflected in block 308. Using a code for transistor identification (block 310) and the base netlist information from conventional extraction of the input layout, the netlist update is produced in block 312, followed by SPICE simulation (block 314) and generation of delay/power data (block 316). It will be noted that this data based on updated netlist from lithography assumes nominal process conditions (i.e., with no variations).

Figure 4:
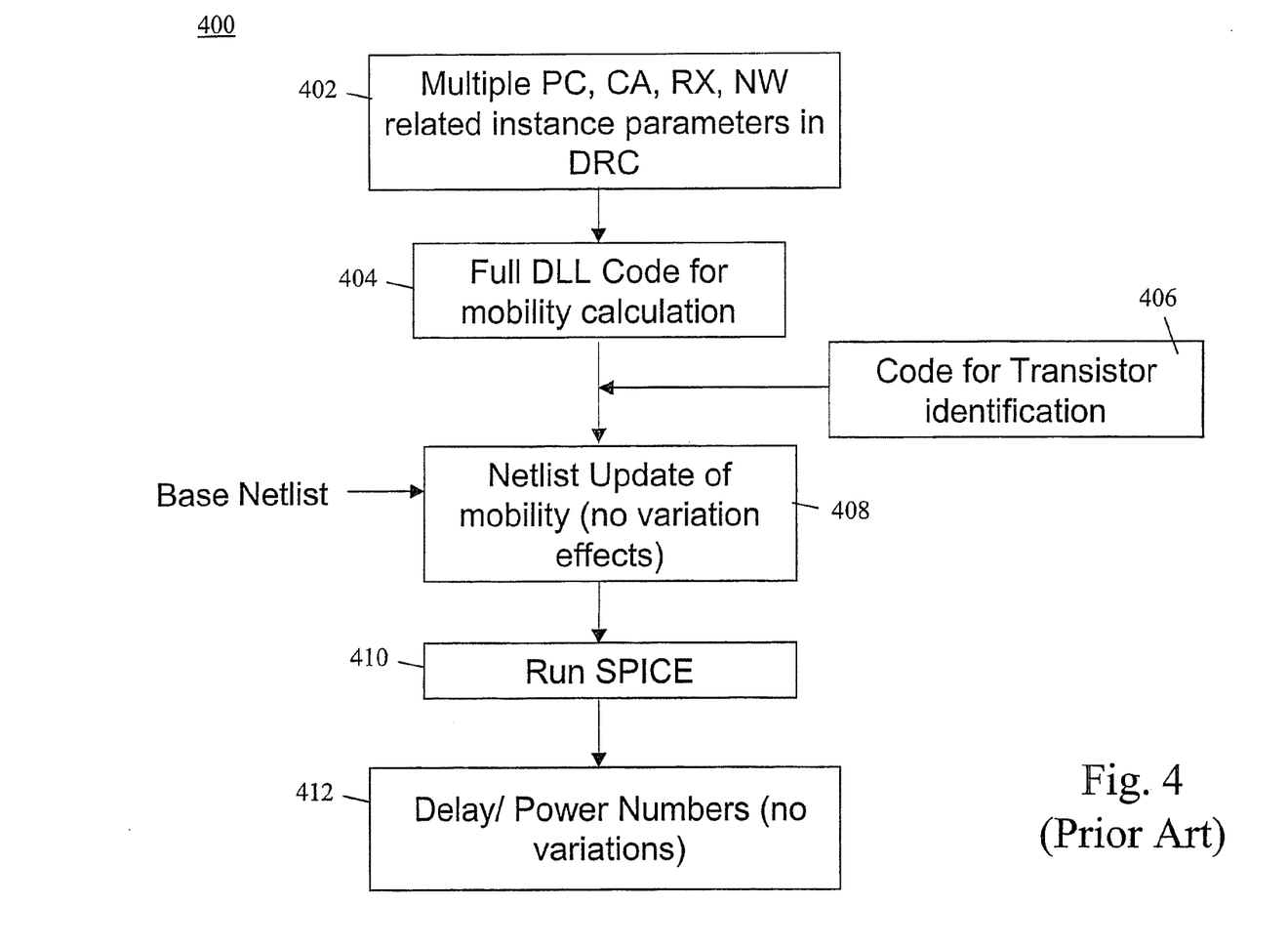
FIG. 4 is a flow diagram illustrating an isolated implementation of stress-based extraction based on calculating stress parameters for mobility update as is known in the prior art.

FIG. 4 illustrates a flow diagram 400 for a conventional stress-based extraction, in which stress parameters are computed from only from the drawn layout. As shown in block 402, the flow utilizes stress parameters based on PC, CA, RX and NW are used to compute a change in mobility of each transistor in block 404. Using a code for transistor identification (block 406) and the base netlist information from conventional extraction of the input layout, the netlist update is produced in block 408, followed by SPICE simulation (block 410) and generation of delay/power data (block 412). It will again be noted that this data based on updated netlist from stress assumes nominal process conditions (i.e., with no variations), and thus cannot predict variability in mobility at different process corners.

Figure 5:
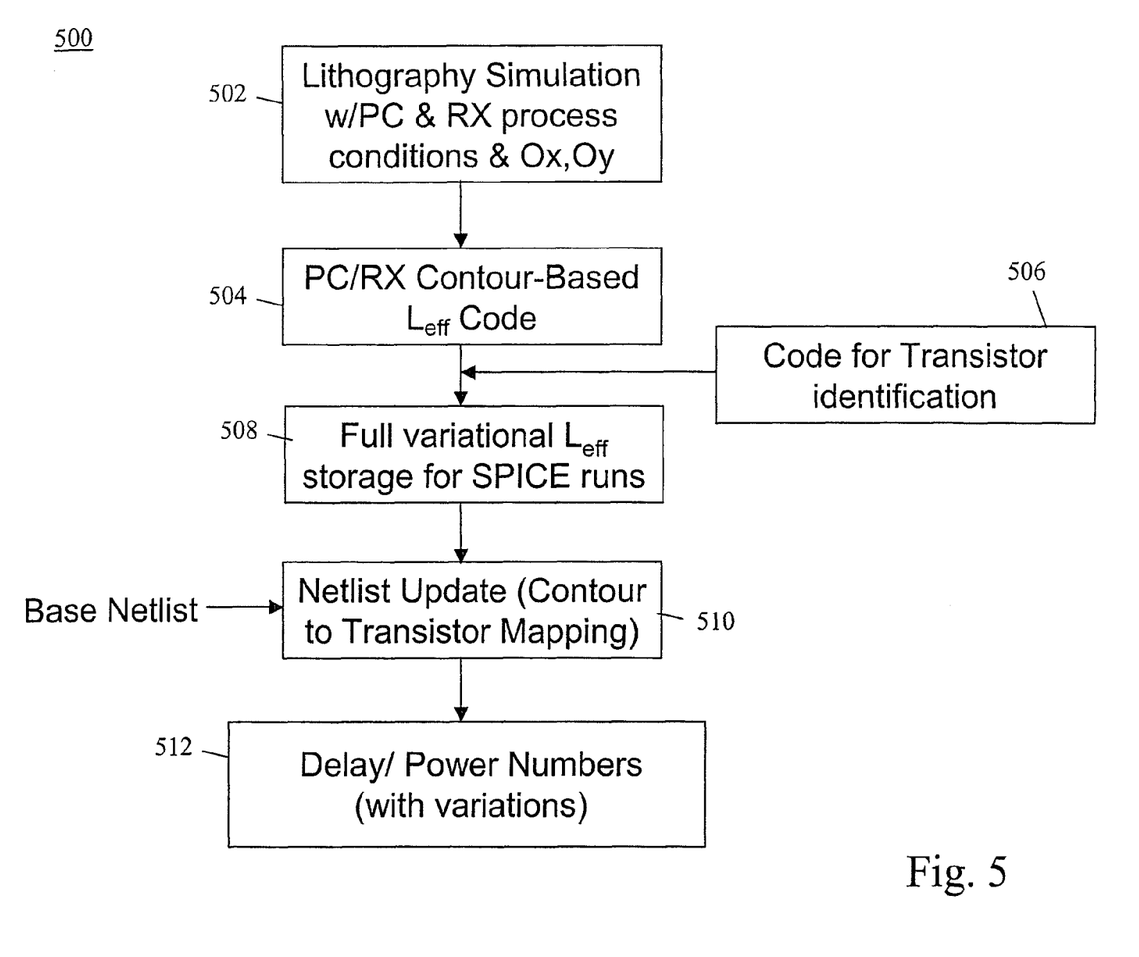
FIG. 5 is a flow diagram illustrating in further detail an exemplary implementation of variation-aware, lithography-based extraction as depicted in FIGS. 1 and 2.

In contrast to FIG. 3, FIG. 5 is a flow diagram 500 illustrating in further detail an exemplary implementation of variation-aware, lithography-based extraction as depicted in FIGS. 1 and 2. In block 502, PC and RX process conditions are used as input to the lithography simulator to generate lithographic contours in block 504. This includes, as outlined above, variations in dose and focus, mask errors, X-overlay (Ox) errors and Y-overlay (Oy) errors. A set of electrical contour models along with a code for transistor identification (block 506) are then used to evaluate a full variational effective gate length ($L_{eff}$) at each of these corners as reflected in block 508. These are stored for later use in SPICE to compute delay or power numbers. With the base netlist information from conventional extraction of the input layout, the netlist update is produced in block 510, followed by SPICE simulation (not shown in FIG. 5) and generation of delay/power data (block 512). As opposed to the flow shown in FIG. 3, this data based on updated netlist from lithography does not assume nominal process conditions and takes into account variations.

Figure 6:
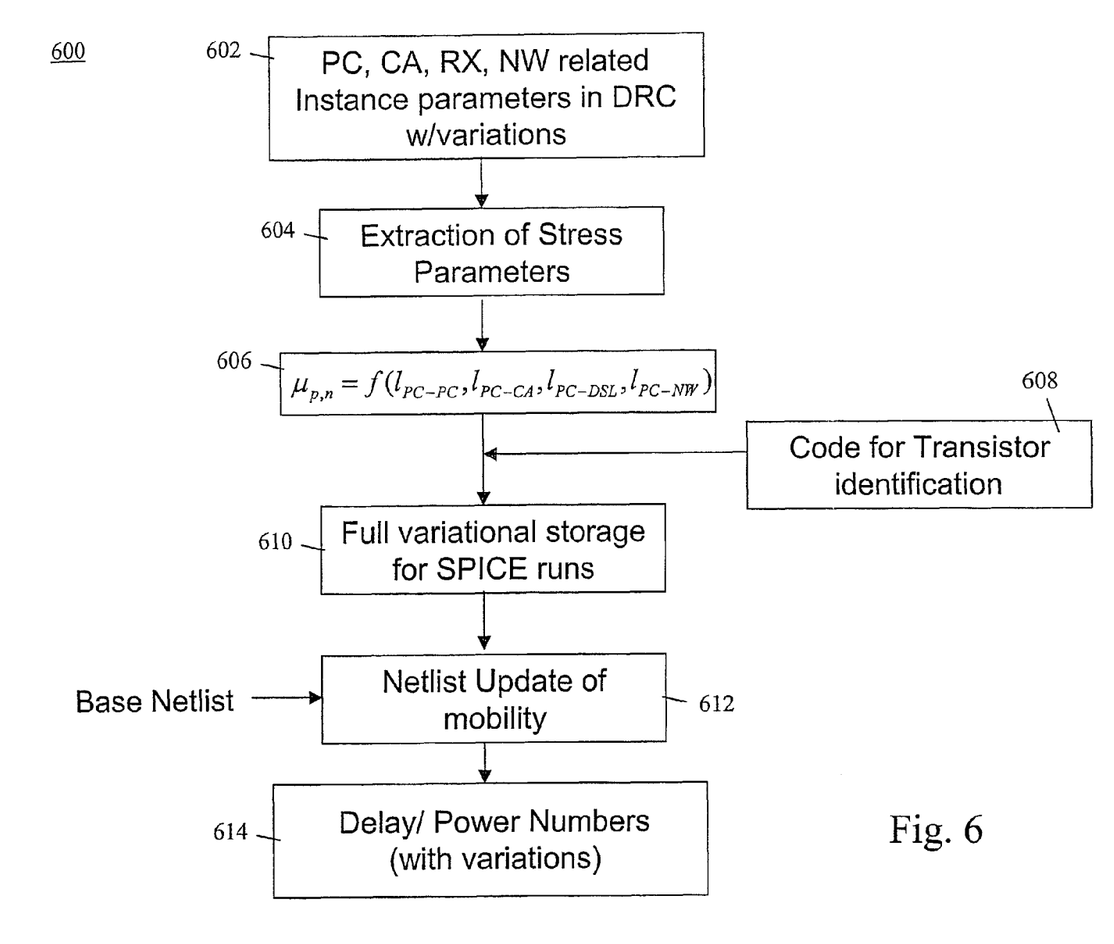
FIG. 6 is a flow diagram illustrating in further detail an exemplary implementation of variation-aware, stress-based extraction as depicted in FIGS. 1 and 2.

Referring next to FIG. 6, there is shown a flow diagram 600 illustrating in further detail an exemplary implementation of variation-aware, stress-based extraction as depicted in FIGS. 1 and 2. As shown in block 602, the flow utilizes the full set of PC, CA, RX and NW instance parameters in design rules checking (DRC) with variations, and extracts the stress parameters associated with the lithography contours generated for the PC, CA, RX and NW conditions in block 604. The stress parameters (with variations) are then used as input to the mobility model in block 606 in order to calculate variations in mobility ($\mu_{p,n}$). Using a code for transistor identification (block 608) the stress mobility variations are stored for later use in SPICE (block 610) to update the netlist of mobility parameters (block 612) and compute delay or power numbers (block 614).

Figure 7:
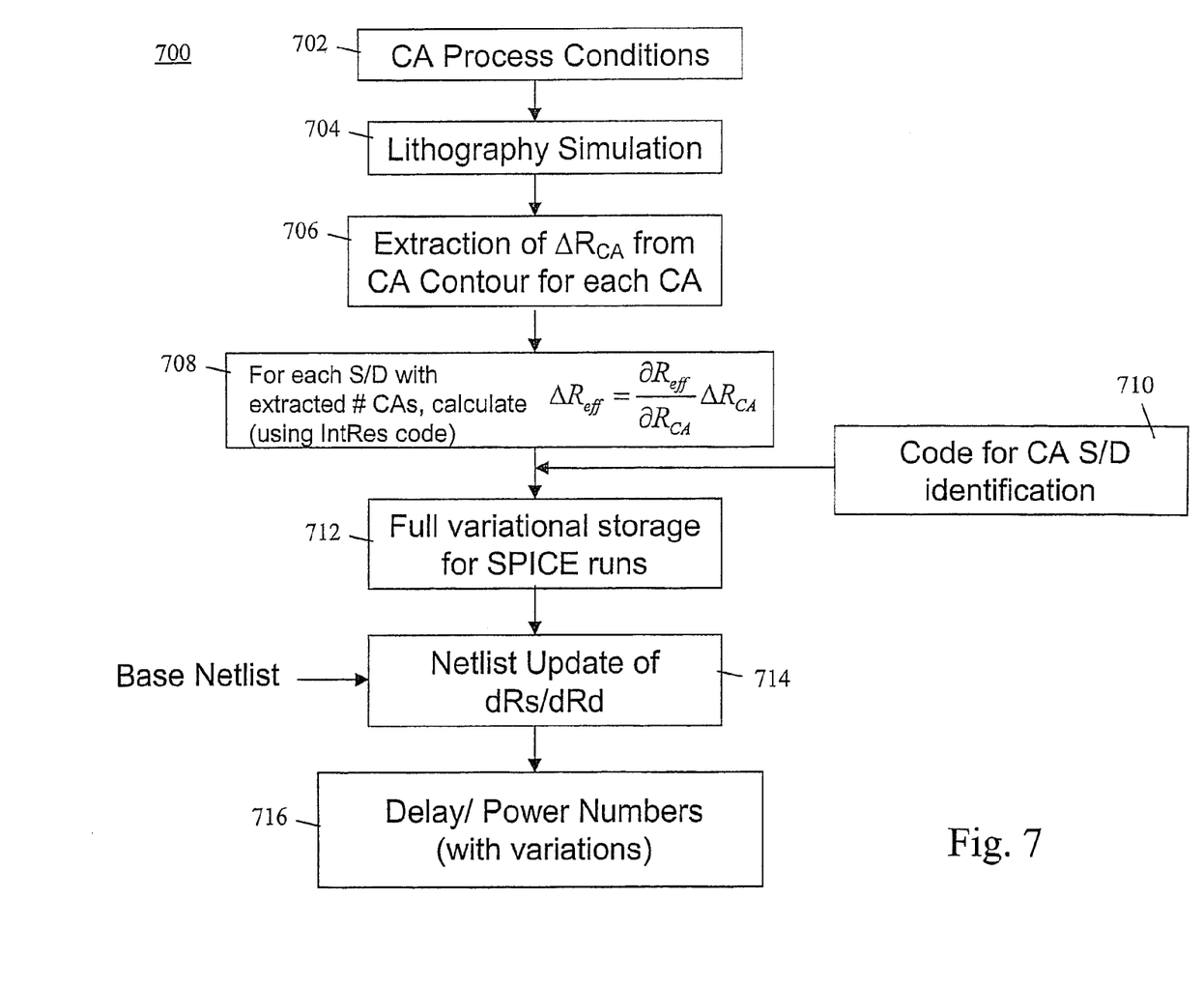
FIG. 7 is a flow diagram illustrating in further detail an exemplary implementation of variation-aware, contact resistance-based extraction as depicted in FIGS. 1 and 2.

FIG. 7 is a flow diagram 700 illustrating in further detail an exemplary implementation of variation-aware, contact resistance-based extraction as depicted in FIGS. 1 and 2. Using various CA process conditions in block 702, and the lithography simulation in block 704, CA contours are generated and then used as input to a CA resistance calculation model to compute variation in CA resistance ($\Delta R_{CA}$), as shown in block 706. A first-order Taylor series expansion is used to calculate the change in device resistance as a function of $\Delta R_{CA}$, as shown in block 708. Using a code for CA source/drain (S/D) identification (block 710) the contact resistance variations are stored for later use in SPICE (block 712) to update the netlist of dRs/dRd parameters (block 714) and compute delay or power numbers (block 716).

Figure 8:
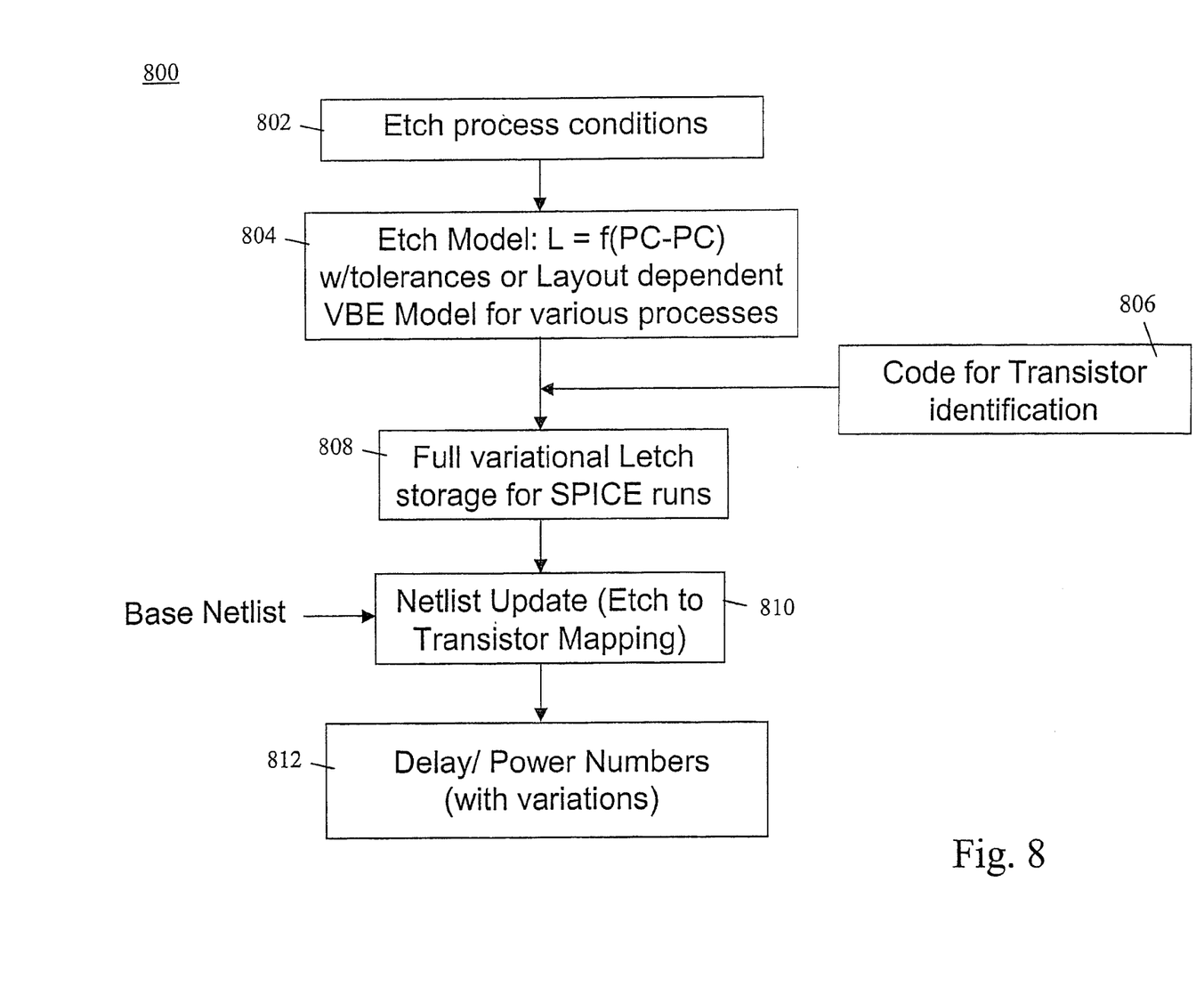
FIG. 8 is a flow diagram illustrating in further detail an exemplary implementation of variation-aware, etch-based extraction as depicted in FIGS. 1 and 2.

Finally, FIG. 8 is a flow diagram 800 illustrating in further detail an exemplary implementation of variation-aware, etch-based extraction as depicted in FIGS. 1 and 2. Through etch modeling, variations in etch processing conditions (block 802) result in a set of PC contours generated at different process corners that are then used to compute PC-PC distance. In lieu of a constant etch bias, the variational etch bias is computed as a function of the PC-PC distance, with tolerances, as shown in block 804. Using a code for transistor identification (block 806) the variations in etch bias are used to modify the gate length as shown in block 808 and are stored for later use in SPICE to update the netlist of etch parameters (block 810) and compute delay or power numbers (block 812).

Figure 9:
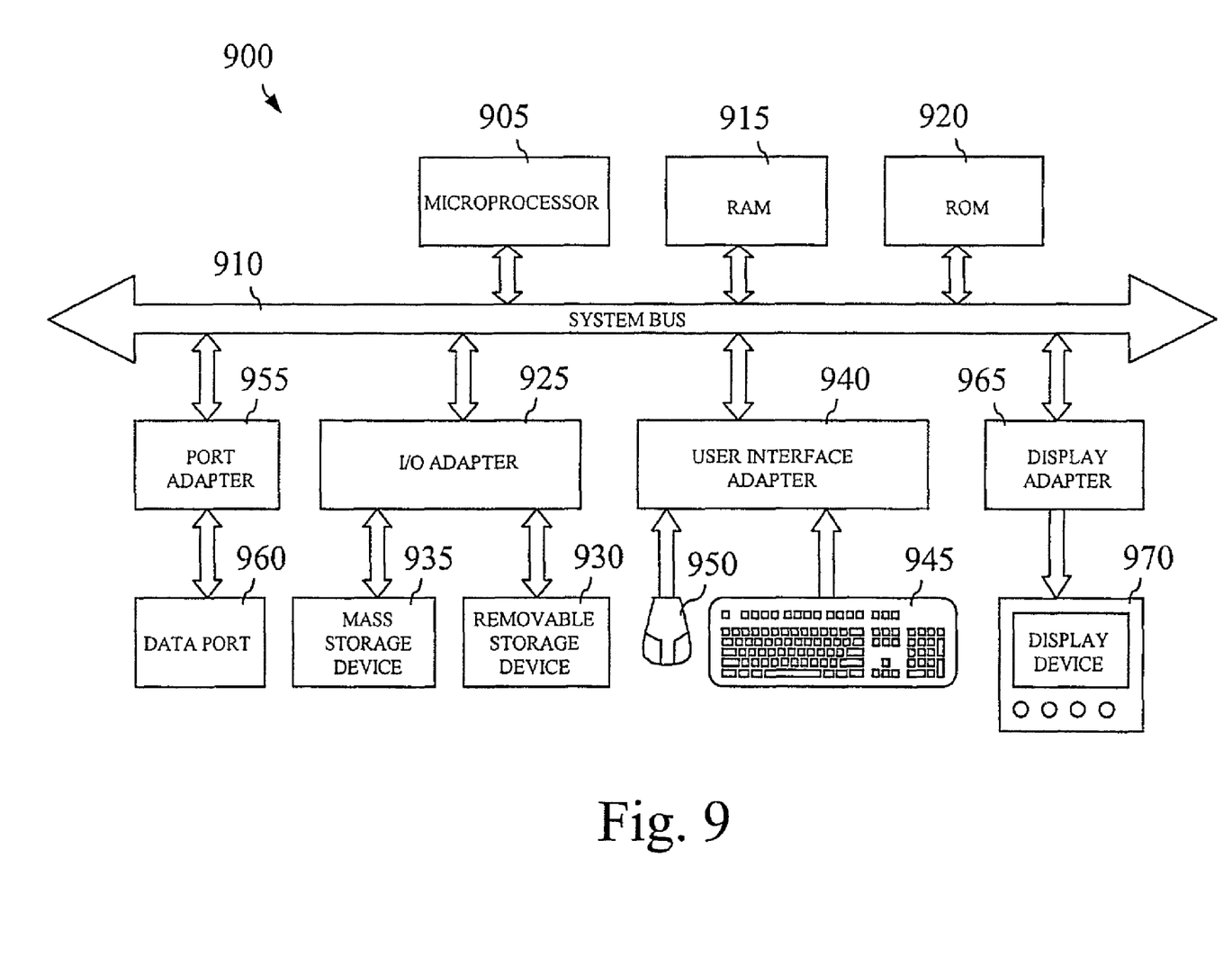
FIG. 9 is a schematic block diagram of a general-purpose computing system suitable for practicing embodiments of the present invention.

Generally, the method embodiments for implementing systematic, variation-aware integrated circuit extraction may be practiced with a general-purpose computer and the method may be coded as a set of instructions on removable or hard media for use by the general-purpose computer. FIG. 9 is a schematic block diagram of a general-purpose computing system suitable for practicing embodiments of the present invention. In FIG. 9, computing system 900 has at least one microprocessor or central processing unit (CPU) 905. CPU 905 is interconnected via a system bus 910 to a random access memory (RAM) 915, a read-only memory (ROM) 920, an input/output (I/O) adapter 925 for a connecting a removable data and/or program storage device 930 and a mass data and/or program storage device 935, a user interface adapter 940 for connecting a keyboard 945 and a mouse 950, a port adapter 955 for connecting a data port 960 and a display adapter 965 for connecting a display device 970.

ROM 920 contains the basic operating system for computing system 900. The operating system may alternatively reside in RAM 915 or elsewhere as is known in the art. Examples of removable data and/or program storage device 930 include magnetic media such as floppy drives and tape drives and optical media such as CD ROM drives. Examples of mass data and/or program storage device 935 include hard disk drives and non-volatile memory such as flash memory. In addition to keyboard 945 and mouse 950, other user input devices such as trackballs, writing tablets, pressure pads, microphones, light pens and position-sensing screen displays may be connected to user interface 940. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 930, fed through data port 960 or typed in using keyboard 945.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 1, 2 and 5-8.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for implementing systematic, variation-aware integrated circuit extraction, the method comprising:
    inputting, using a computer, a set of processing conditions to a plurality of variation models, each model corresponding to a separate systematic, parametric variation associated with semiconductor manufacturing of an integrated circuit layout, wherein the systematic, parametric variation models include: a lithography model, an etch model, a carrier mobility stress model, and a contact area resistance model;
    generating, for each variation model, a netlist update attributable to the associated variation, wherein the netlist update is an update with respect to an original netlist extracted from the integrated circuit layout; and
    storing the netlist updates generated for each of the processing conditions.

2. The method of claim 1, wherein a netlist update for a given one of variation models is generated independently from the netlist updates of the other variation models.

3. The method of claim 1, wherein the set of processing conditions to the plurality of variation models include variations in the processing conditions themselves.

4. The method of claim 3, wherein variations in the processing conditions include lithographic variations in dose and focus, mask errors, X-overlay errors and Y-overlay errors.

5. The method of claim 3, wherein variations in the processing conditions include etch rate bias.

6. The method of claim 1, further comprising executing an integrated circuit simulator program on the stored netlist updates so as to determine the extent of systemic processing variations on circuit parameters.

7. The method of claim 1, wherein a netlist update for only one of the variation models is generated directly from the original netlist, and the remaining netlist updates for the other variation models are dependent upon at least one other netlist update from another of the variation models.

8. The method of claim 1, wherein one of the plurality of variation models comprises contact area (CA) process conditions, and wherein the method further comprises:
    generating a plurality of CA contours for the integrated circuit layout based on a plurality of CA process conditions;
    inputting the CA contours to a CA resistance model so as to determine a variation in CA resistance ($\Delta R_{CA}$);
    calculating a change in device resistance as a function of $\Delta R_{CA}$; and
    generating and storing one or more netlist updates attributable to variations in CA process conditions.

9. The method of claim 8, further comprising executing an integrated circuit simulator program on the stored netlist updates so as to determine the extent of CA processing variations on circuit parameters.

10. The method of claim 1, wherein one of the plurality of variation models comprises etch process conditions, and wherein the method further comprises:
    inputting a plurality of etch process conditions to an etch model so as to determine a variation in polysilicon conductor to polysilicon conductor (PC to PC) distance for the integrated circuit layout;
    using variational etch bias computed as a function of the PC-PC distance to modify an effective gate length for devices of the integrated circuit layout; and
    generating and storing one or more netlist updates attributable to variations in etch bias conditions.

11. The method of claim 10, further comprising executing an integrated circuit simulator program on the stored netlist updates so as to determine the extent of etch bias variations on circuit parameters.

12. A computer program product, comprising:
    a non-transitory, computer readable storage medium having computer program code stored thereon that, when executed, cause a computer to implement a method for implementing systematic, variation-aware integrated circuit extraction, the method comprising:
        inputting a set of processing conditions to a plurality of variation models, each model corresponding to a separate systematic, parametric variation associated with semiconductor manufacturing of an integrated circuit layout, wherein the systematic, parametric variation models include: a lithography model, an etch model, a carrier mobility stress model, and a contact area resistance model;
        generating, for each variation model, a netlist update attributable to the associated variation, wherein the netlist update is an update with respect to an original netlist extracted from the integrated circuit layout; and
        storing the netlist updates generated for each of the processing conditions.

13. The computer program product of claim 12, wherein a netlist update for a given one of variation models is generated independently from the netlist updates of the other variation models.

14. The computer program product of claim 12, wherein the set of processing conditions to the plurality of variation models include variations in the processing conditions themselves.

15. The computer program product of claim 14, wherein variations in the processing conditions include lithographic variations in dose and focus, mask errors, X-overlay errors and Y-overlay errors.

16. The computer program product of claim 14, wherein variations in the processing conditions include etch rate bias.

17. The computer program product of claim 12, wherein the method further comprises executing an integrated circuit simulator program on the stored netlist updates so as to determine the extent of systemic processing variations on circuit parameters.

18. The computer program product of claim 12, wherein a netlist update for only one of the variation models is generated directly from the original netlist, and the remaining netlist updates for the other variation models are dependent upon at least one other netlist update from another of the variation models.

* * * * *